2,819,304
Patented Jan. 7, 1958

2,819,304
PROCESS FOR THE PRODUCTION OF THIOETHER DICARBOXYLIC ACIDS

Walter Reppe, Ludwigshafen (Rhine), Herbert Friederich, Worms, and Heinrich Laib, Heddesheim, Bergstrasse, Germany, assignors to Badische Anilin- & Soda-Fabrik Aktiengesellschaft, Ludwigshafen (Rhine), Rheinland-Pfalz, Germany No Drawing. Application December 22, 1952
Serial No. 327,416

Claims priority, application Germany December 29, 1951

6 Claims. (Cl. 260—537)

This invention relates to a new and improved method for the production of thioether dicarboxylic acids.

It is known that thioether dicarboxylic acids can be obtained in the form of their salts by heating five- or six-membered lactones with anhydrous alkali or alkaline earth metal sulfides or hydrosulfides at ordinary pressure. In order to carry out that process, it was thought to be necessary to dehydrate the metal sulfides to be used thoroughly.

We have now found that thioether dicarboxylic acids can be obtained in a very simple manner with an almost quantitative yield and in a state of high purity by heating five- or six-membered lactones in the presence of water with alkali or alkaline earth metal sulfides or hydrosulfides to temperatures of about from 120° to 300° C. in pressure-tight vessels.

In the practice of our invention the alkali metal or alkaline earth metal sulfides or hydrosulfides are advantageously used in the form of their aqueous solutions; the reaction may also be performed with technical-grade sodium sulfide hydrate ($Na_2S.9H_2O$) without any further addition of water. It is recommended to add water in such an amount as to have the reaction proceed in a homogeneous phase. When hydrosulfides are used, the hydrogen sulfide pressure is advantageously released from time to time.

Examples of lactones which may be used in the practice of our invention are gamma-butyrolactone, gamma- or delta-valerolactone, angelica lactone and the lactone of benzyl alcohol-o-carboxylic acid.

According to an alternative embodiment of our invention thioether dicarboxylic acids may also, in the form of their salts, be prepared by heating about equivalent quantities of a lactone and a thiolactone to temperatures of between about 120° and 300° C. in an aqueous-alkaline medium in a pressure-tight vessel.

When butyrolactone, thiobutyrolactone and sodium hydroxide, for example, are used the reaction proceeds according to the following equation:

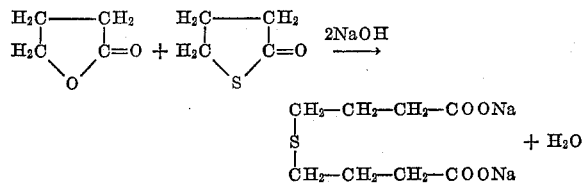

When different type lactones and thiolactones are used instead of those of an analogous type as in the case of the aforementioned scheme, salts of mixed thioether dicarboxylic acids are obtained. Instead of caustic soda solution any other alkali, such as caustic potassium hydroxide or potassium carbonate, or alkaline earth oxides and hydroxides, such as calcium hydroxide may be used. In some cases, especially when asymmetrical thioether dicarboxylic acids are required, the preferred procedure will be to cause the lactone to react with the aqueous alkali first in order to have it converted wholly or partially into the alkali salt of the corresponding hydroxycarboxylic acid, and then to add the thiolactone.

By reason of the corrosive properties of the sulfur compounds vessels of stainless steel are recommended.

The process may be conducted batchwise or continuously. The preferred technique in this latter case is to introduce the reaction components into a pressure-tight tube, which is suitably heated, at various points to start the reaction, means being provided for the elimination of the heat disengaged. It is not necessary to work in the presence of an inert gas, as nitrogen.

Contrary to expectation, by the method according to our invention, salts of thioether dicarboxylic acids or of their aqueous solutions are formed from which the pure thioether dicarboxylic acids can be precipitated as a colorless substance and with an almost quantitative yield upon acidification. This may be carried out with any stronger acid, hydrochloric and sulfuric acid being preferred.

The thioether dicarboxylic acids are valuable as intermediates, especially for plasticisers and plastics.

The following examples will illustrate the nature of our invention and how the same is to be carried out in practice, but the invention is not restricted to these examples. The parts are by weight.

Example 1

A solution of 220 parts of crystalline sodium sulfide hydrate ($Na_2S.9H_2O$) in 400 parts of water and 144 parts of gamma-butyrolactone are heated in a shaking autoclave of stainless steel for 5 hours at 250° C. After cooling, the solution is acidified with 32 percent hydrochloric acid until a pH of 3 has been attained. The colorless thiodipropylether dicarboxylic acid which has settled out is filtered off by suction, washed with water and dried at 70° C. at reduced pressure. Without having undergone further purification it shows a fusion point of 99° C. The yield is of 97 percent of the theory, calculated with reference to gamma-butyrolactone reacted.

Example 2

A solution of 200 parts of crystalline sodium sulfide hydrate ($Na_2S.9H_2O$) in 300 parts of water and 144 parts of gamma-butyrolactone are heated in a shaking autoclave at 180° C. for 12 hours. The colorless solution obtained is acidified with sulfuric acid. 162 parts of pure thiodipropylether dicarboxylic acid having a fusion point of 98° to 99° C. are obtained.

Example 3

2000 parts of a technical-grade 15 percent aqueous solution of sodium sulfide and 1445 parts of a 45 to 48 percent aqueous solution of gamma-butyrolactone, such as is obtainable in the large-scale dehydration of 1.4-butandiol, are heated in a shaking autoclave of stainless steel at 200° C. for 9 hours. By further processing according to Example 1 there are obtained 646 parts of an almost pure thiodipropylether dicarboxylic acid which comes up to a yield of 95 percent of the theoretical yield.

Example 4

200 parts of crystalline sodium sulfide hydrate ($Na_2S.9H_2O$) and 144 parts of gamma-butyrolactone are heated in a shaking autoclave of stainless steel at 220° C. for 12 hours. The resultant crystal pulp of the soduim salt of thiodipropylether dicarboxylic acid is dissolved in 250 parts of water and the solution is acidified with hydrochloric acid. There are obtained 139 parts of thiodipropylether dicarboxylic acid which corresponds to a yield of 80 percent of the theoretical yield.

In the same manner, gamma- or delta-valerolactone or angelica lactone can be reacted with sodium sulfide whereby the corresponding thioether dicarboxylic acids result.

Example 5

A mixture of 1000 parts of a 15 percent aqueous solution of sodium sulfide and 330 parts of gamma-butyrolactone prepared and stored at about —5° to +2° C. is pumped through a stainless steel tube having 30 metres in length and 30 millimetres in internal width, heated at 260° C., at a rate of 40 litres per hour. When further processing the mixture as described in Example 1 there are obtained 280 parts of thiodipropylether dicarboxylic acid (equal to 94.5 percent of the theoretical yield) for each 1000 parts of the reaction mixture.

Example 6

A mixture of 100 parts of gamma-butyrothiolactone, 85 parts of gamma-butyrolactone, 80 parts of sodium hydroxide and 250 parts of water is heated at 220° C. in a shaking autoclave for 10 hours. After cooling the colorless solution is acidified until a pH of 3 is attained, the gamma.gamma'-thiodipropylether dicarboxylic acid formed is filtered off by suction, washed with water and dried at about 70° C. at reduced pressure. The yield is 187 parts which is 91 percent of the theoretical yield. The product needs no further purification and has a fusion point of 97° to 99° C.

What we claim is:

1. An improved process for the production of a thioether dicarboxylic acid which comprises heating a reaction mixture of a lactone selected from the group consisting of gamma-butyrolactone, gamma- and delta-valerolactone and angelica lactone, and a member of the group consisting of alkali metal and alkaline earth metal sulfides and hydrosulfides and thiolactones corresponding to the above mentioned group of lactones, in an aqueous alkaline media to a temperature of from about 120° C. to 300° C. and under a superatmospheric pressure in a range equivalent to that determined by said temperature of said reaction mixture in a closed system of constant volume.

2. The improved process of claim 1 wherein the heating of the reaction mixture is carried out in a pressure-tight, stainless steel vessel.

3. The improved process of claim 1 wherein a thioether dicarboxylic acid salt obtained as a reaction product is acidified to form its corresponding acid.

4. An improved process for the production of thiodipropyl ether dicarboxylic acid which comprises heating a reaction mixture of an aqueous solution of crystalline sodium sulfide hydrate and gamma-butyrolactone for 5 to 12 hours at a temperature of 180° C. to 260° C. in a pressure-tight vessel and under a superatmospheric pressure determined by said temperature in said pressure-tight vessel.

5. An improved process for the production of thiodipropyl ether dicarboxylic acid which comprises pumping a reaction mixture of an aqueous solution of sodium sulfide and gamma-butyrolactone through a pressure-tight, stainless steel reaction tube heated to a temperature of about 260° C. under a pressure determined by said temperature in said pressure-tight tube, and acidifying the reaction product.

6. An improved process for the production of thiodipropyl ether dicarboxylic acid which comprises heating a reaction mixture of about equivalent amounts of gamma-butyrolactone and gamma-butyrothiolactone in an aqueous sodium hydroxide solution at a temperature of about 220° C. in a pressure-tight vessel and under a superatmospheric pressure determined by said temperature in said pressure-tight vessel, and acidifying the reaction product.

References Cited in the file of this patent

UNITED STATES PATENTS

| 2,449,987 | Gresham | Sept. 28, 1948 |
| 2,449,989 | Gresham | Sept. 28, 1948 |

OTHER REFERENCES

Johansson: Ber. Deut. Chem., vol. 48, pp. 1262–1266 (1915).

Gresham et al.: J. Am. Chem. Soc., vol. 70 (1948), pp. 999–1001.

Nishigori et al.: Chem. Abst. 47 (1953), 6345C (effective date 1951, published in Chem. High Polymers (Japan), vol. 8, pp. 253–6).